US009388301B2

(12) United States Patent
Shimizu et al.

(10) Patent No.: US 9,388,301 B2
(45) Date of Patent: Jul. 12, 2016

(54) CELLULOSE-DERIVED TRANSPARENT SUBSTRATE

(71) Applicant: Toppan Printing Co., Ltd., Tokyo (JP)

(72) Inventors: Kosuke Shimizu, Tokyo (JP); Yumiko Oomori, Tokyo (JP); Mizuhiro Tani, Tokyo (JP); Akiko Saiki, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 14/257,842

(22) Filed: Apr. 21, 2014

(65) Prior Publication Data

US 2014/0228487 A1 Aug. 14, 2014

Related U.S. Application Data

(63) Continuation of application No. 13/784,123, filed on Mar. 4, 2013, now abandoned, which is a continuation of application No. PCT/JP2011/069009, filed on Aug. 24, 2011.

(30) Foreign Application Priority Data

Sep. 6, 2010 (JP) ................................. 2010-198897
Mar. 18, 2011 (JP) ................................. 2011-061644

(51) Int. Cl.
| | | |
|---|---|---|
| C08L 1/00 | (2006.01) | |
| C08L 1/10 | (2006.01) | |
| C08L 1/04 | (2006.01) | |
| G02B 1/10 | (2015.01) | |
| C09D 101/08 | (2006.01) | |
| C08B 15/02 | (2006.01) | |
| C08J 5/18 | (2006.01) | |
| G02B 5/30 | (2006.01) | |

(52) U.S. Cl.
CPC . *C08L 1/10* (2013.01); *C08B 15/02* (2013.01); *C08J 5/18* (2013.01); *C08L 1/04* (2013.01); *C09D 101/08* (2013.01); *G02B 1/105* (2013.01); *C08J 2301/04* (2013.01); *G02B 5/3033* (2013.01)

(58) Field of Classification Search
CPC .............. C08L 1/04; C08L 1/08; C08L 1/00; C09D 101/04; C09D 101/08; C08B 15/02; G02B 1/105; G02B 5/3033
See application file for complete search history.

(56) References Cited

U.S. PATENT DOCUMENTS

| | | | |
|---|---|---|---|
| 6,379,494 B1 | 4/2002 | Jewell et al. | |
| 6,524,384 B2 | 2/2003 | Griffith et al. | |
| 8,012,573 B2 | 9/2011 | Kowata et al. | |
| 2008/0000603 A1* | 1/2008 | Neogi et al. | 162/182 |
| 2010/0233481 A1* | 9/2010 | Isogai et al. | 428/401 |
| 2010/0282422 A1* | 11/2010 | Miyawaki | C08B 15/02 162/76 |

FOREIGN PATENT DOCUMENTS

| | | | |
|---|---|---|---|
| EP | 2 216 345 | 8/2010 | |
| EP | 2 226 171 | 9/2010 | |
| JP | 2003-512540 | 4/2003 | |
| JP | 2010-043144 | 2/2010 | |
| JP | 2010-116477 | 5/2010 | |
| JP | 2010-168572 | 8/2010 | |
| WO | WO 2009069641 | 6/2009 | |
| WO | WO 2009069641 A1 * | 6/2009 | |
| WO | WO 2009081881 | 7/2009 | |
| WO | WO 2009084566 A1 * | 7/2009 | ............. C08B 15/02 |
| WO | WO 2010/055839 | 5/2010 | |
| WO | WO 2010/074340 | 7/2010 | |

OTHER PUBLICATIONS

Saito, T., et al., "Homogeneous Suspensions of Individualized Microfibrils from TEMPO-Catalyzed Oxidation of Native Cellulose," Biomacromolecules, 2006, 7, 1687-1691.*
International Preliminary Report on Patenttability and Written Opinion of the International Searching Authority for appl. PCT/JP2011/069009, mailed Nov. 29, 2011, 9 pgs.
Extended European Search Report for a related application EP 11823410.3, mailed Jan. 8, 2014, 6 pgs.
Machine Translation of JP2010-168572. Performed on JPO website, Jul. 10, 2013.
Machine Translation of WO 2010/055839. Performed on WIPO website, Jul. 25, 2013.
Tamura et al., "Oxidation of Curdlan and Other Polysaccharides by 4-Acetamide-TEMPO/NaClO/NaClO2 under Acidic Conditions," Carbohydrate Polymers 81, pp. 592-598 (2010).
Zhao et al., "Oxidation of Primary Alcohols to Carboxylic Acids with Sodium Chlorite Catalyzed by TEMPO and Bleach," J. Org. Chem. 64, pp. 2564-2566 (1999).

* cited by examiner

*Primary Examiner* — Liam J Heincer
*Assistant Examiner* — Nicholas Hill
(74) *Attorney, Agent, or Firm* — Squire Patton Boggs (US) LLP

(57) ABSTRACT

The present invention provides a formed article, or more specifically a transparent substrate, which effectively utilizes a natural stuff and which has a low linear expansion coefficient, a high light transmittance and an appropriate level of moisture permeability. The transparent substrate includes at least an oxidized polysaccharide and has a linear expansion coefficient of 50 ppm/° C. or less at 30-150° C. and a light transmittance of 70% or more at 660 nm. Its manufacturing method includes an oxidation process in which cellulose reacts with TEMPO or its derivatives as a catalyst to be oxidized in water under the presence of a co-oxidant, along with a fiberizing process in which the oxidized cellulose is fiberized in water to form a cellulose fiber, and a substrate-forming process in which a transparent substrate is formed from a cellulose dispersion liquid containing the cellulose fiber.

2 Claims, No Drawings

CELLULOSE-DERIVED TRANSPARENT SUBSTRATE

This application is a continuation of U.S. patent application Ser. No. 13/784,123 filed Mar. 4, 2013, which is a continuation of International Application No. PCT/JP2011/069009, filed Aug. 24, 2011, both of which are incorporated herein by reference in its entirety.

BACKGROUND OF THE INVENTION

1. Field of the Invention

The present invention relates to a transparent substrate which includes a natural stuff. More specifically, the present invention relates to a transparent substrate which includes a cellulose fiber having a substituted group.

2. Description of the Related Art

In recent years, much research has been conducted on natural stuffs available for use as a transparent substrate as an alternative to a triacetyl cellulose (TAC) film. While it has been, for example, found that it is possible to make remarkably fine cellulose nanofibers from cellulose fibers by a chemical and/or mechanical treatment, it has further been found that a formed article having robustness and a low linear expansion coefficient can be obtained from a composite material in which such cellulose nanofibers are utilized as an infill (Patent document 1, for example).

Patent document 1: JP-A-2010-116477.

In the case where the formed articles manufactured by a conventional forming method is employed in a practical product, however, there are problems of insufficient transparency, discoloration by heat, low water resistance that causes swelling with water when immersed or dipped in water, dimensional instability when left in an air because of moisture absorption, and large variations in physical properties due to water absorption. The formed article manufactured by a conventional forming method lacks sufficient stability for use as a transparent substrate. In particular, the formed article has not had sufficient durability to be used as a transparent substrate of a protection film for a polarizing plate etc. It has been inevitable to find and establish some new forming processes for solving these problems.

SUMMARY OF THE INVENTION

The present invention solves the above problems. The present invention provides a transparent substrate which is obtained by effectively using a natural stuff and which concurrently has a low linear expansion coefficient, a high light transmittance, an appropriate level of moisture permeability, high robustness, few variations in characteristics, and water resistance.

After an eager study considering the above problems, the present invention was accomplished. It has been found that it is possible to solve the problems by oxidizing a polysaccharide to substitute a hydroxyl group and/or an aldehyde group with a carboxy group under a predetermined condition followed by forming into a transparent substrate and by reacting carboxy groups and/or hydroxyl groups of the polysaccharide which has been oxidized under the predetermined condition together to cross-link the molecules.

A first aspect of the present invention is a transparent substrate including a polysaccharide, the polysaccharide being oxidized and the transparent substrate having a linear expansion coefficient of 50 ppm/° C. or less at a temperature in the range of 30-150° C. and 70% or higher of light transmittance at 660 nm.

In addition, a second aspect of the present invention is the transparent substrate according to the first aspect of the present invention, further including a polymer having a plurality of functional groups in a single molecule, and wherein the functional groups are one or both of an oxazoline group and an isocyanate group.

In addition, a third aspect of the present invention is the transparent substrate according to the second aspect of the present invention, wherein the polysaccharide is a cellulose fiber having a crystal structure of cellulose I, and wherein the cellulose fiber has a fiber width in the range of 1 nm to 200 nm.

In addition, a fourth aspect of the present invention is the transparent substrate according to the third aspect of the present invention, wherein an aldehyde group amount contained in the cellulose fiber is 0.2 mmol/g or less.

In addition, a fifth aspect of the present invention is the transparent substrate according to the fourth aspect of the present invention, wherein a carboxy group amount contained in the cellulose fiber is in the range of 0.1-2.5 mmol/g.

In addition, a sixth aspect of the present invention is the transparent substrate according to the fifth aspect of the present invention, wherein the cellulose fiber has a degree of polymerization in the range of 100-1000.

In addition, a seventh aspect of the present invention is the transparent substrate according to the fifth aspect of the present invention, wherein the transparent substrate contains the cellulose fiber at a ratio in the range of 1-99.9%.

In addition, an eighth aspect of the present invention is the transparent substrate according to the fifth aspect of the present invention, further including a UV absorber, a degradation inhibitor and a hydrophobic additive other than said cellulose fiber.

In addition, a ninth aspect of the present invention is the transparent substrate according to the first aspect of the present invention, wherein a light transmittance of said transparent substrate at 450 nm after heating at 100° C. for 3 hours is 70% or more.

In addition, a tenth aspect of the present invention is the transparent substrate according to the first aspect of the present invention, wherein the transparent substrate has a moisture permeability of 1-99 $g/m^2/24$ hr.

In addition, an eleventh aspect of the present invention is the transparent substrate according to the second aspect of the present invention, wherein a YI value of the transparent substrate after heating at 150° C. for 1.5 hours is 2 or less.

In addition, a twelfth aspect of the present invention is the transparent substrate according to the second aspect of the present invention, wherein water absorption of the transparent substrate after immersing in water for an hour is 50% or less with respect to the transparent substrate.

In addition, a thirteenth aspect of the present invention is the transparent substrate according to the fifth aspect of the present invention, wherein the transparent substrate has a thickness in the range of 10-200 μm.

In addition, a fourteenth aspect of the present invention is a protection film for a polarizing plate including the transparent substrate according to the fifth aspect of the present invention.

In addition, a fifteenth aspect of the present invention is a manufacturing method of transparent substrate including an oxidation process in which cellulose in water is oxidized with 2,2,6,6-tetramethyl-1-piperidine-N-oxyl or its derivative as a catalyst under the presence of a co-oxidant to obtain oxidized cellulose, a fiberizing process in which the oxidized cellulose is fiberized in water to obtain a cellulose fiber, and a substrate-forming process in which a transparent substrate is formed using a cellulose dispersion liquid which contains the cellulose fiber.

In addition, a sixteenth aspect of the present invention is the manufacturing method of a transparent substrate according to the fifteenth aspect of the present invention, further including a preparation process in which the cellulose dispersion liquid is prepared by blending the cellulose fiber with a polymer having a plurality of functional groups in a single molecule wherein the functional groups are at least one selected from an oxazoline group and an isocyanate group after the fiberizing process and before the substrate-forming process.

In addition, a seventeenth aspect of the present invention is the manufacturing method of a transparent substrate according to the sixteenth aspect of the present invention, wherein the cellulose dispersion liquid is prepared by blending the cellulose fiber with the polymer at a pH in the range of 3 to 6 in the preparation process.

In addition, an eighteenth aspect of the present invention is the manufacturing method of a transparent substrate according to the seventeenth aspect of the present invention, further including a heating process in which the transparent substrate receives a heat treatment after the substrate-forming process.

The present invention provides a transparent substrate which is obtained by effectively using a natural stuff and which hardly discolors with heat and has a low linear expansion coefficient, a high light transmittance and an appropriate level of moisture permeability. In addition, the present invention provides a transparent substrate which is robust and water-resistant, and has few variations in characteristics.

EMBODIMENT OF THE INVENTION

Celluloses and polysaccharides such as chitin and chitosan, which exist, for example, in exoskeletons of crustaceans (such as crabs and shrimps etc.) and insects (such as beetles and crickets etc.) as well as in fungi and cell walls, can be used as the natural stuff or natural material in the present invention.

In the case where the natural stuff is a cellulose, there is no particular limitation to the cellulose as the raw material. Various kinds of wood or non-wood pulps, microbially-fabricated celluloses, Valonia cellulose, sea squirt cellulose, regenerated celluloses such as rayon etc. can be used as the cellulose. There is no particular limitation with respect to pulping method, purifying method and bleaching method etc. However, it is preferable that highly-purified cellulose such as a dissolving pulp or a bleached pulp etc. is used in order to control a reaction and to improve purity and reproducibility. In addition, it is also possible to use powdery substances which are grinded or pulverized by a high pressure homogenizer, frost shattering, a mill or a grindstone etc. and to use fine celluloses which are purified by a chemical treatment such as hydrolysis, various commercially-available cellulose powders and microcrystalline cellulose powders.

Natural cellulose forms a cellulose nanofiber having a highly crystalline structure and a length in the range of a few nanometers to hundreds of nanometers owing to a synthesis by cellulose synthase and a self-organization in a broad sense. A cellulose fiber is formed in such a way that these cellulose nanofibers are rolled up together orienting in various directions. Hence, a natural cellulose inherently has crystallinity of 70% or more. It is possible to obtain a cellulose fiber with a highly crystalline structure by fiberizing a natural cellulose such as pulp, cotton and bacterial cellulose etc. to a structural level as close to a cellulose nanofiber as possible without destroying the crystalline structure. For example, a method in which firstly an oxidation treatment efficiently introducing a carboxy group onto a crystalline surface of a pulp is performed and subsequently a physical fiberization treatment is performed to the resultant hydroscopic product, and a method in which a fiberization by a high pressure homogenizer or a jet mill etc. is performed without any chemical pretreatment can be specifically used. In addition, the cellulose fiber produced by fiberizing natural cellulose can preferably be used in terms of high transparency because a dense film can be formed due to hydrogen bonds between hydroxyl groups and/or carboxy groups of the cellulose fibers. Incidentally, the examples described below are only examples of controlling an amount of aldehyde group, an amount of carboxy group and a degree of polymerization etc. in the cellulose fiber of the present invention, and thus the scope of the present application is not limited to these.

It is preferable that the method for introducing a carboxy group into the cellulose fiber is a method in which the reaction of introducing the carboxy group proceeds leaving the crystal structure of the cellulose fiber unchanged. Although various methods have been developed until now, only an example of treating a wood pulp in an aqueous system is described.

A method of oxidizing cellulose with a co-oxidant under the presence of an N-oxyl compound (an oxo-ammonium salt) is an example of an oxidation method which is able to efficiently introduce a carboxy group onto a surface of the cellulose fiber and which is carried out in an aqueous system. 2,2,6,6-tetramethyl-1-piperidine-N-oxyl (hereinafter, referred to as "TEMPO") and its derivatives are included in examples of the N-oxyl compound. In this oxidation method, it is possible to efficiently and evenly introduce the carboxy group in proportion to the degree of oxidation progress. It is advantageous if this oxidation reaction is performed under the co-presence of the N-oxyl compound and a bromide or an iodide. A bromide or iodide which disassociates to ions in water, for example, an alkali metal bromide and an alkali metal iodide etc. can be used as the bromide or iodide. Any oxidant such as halogens, hypohalous acids, halous acids, perhalogen acids (such as perchloric acid and periodic acid etc.), their salts, halogen oxides, nitrogen oxides and peroxides etc. can be used as the co-oxidant as long as the oxidant promotes the targeted oxidation reaction.

By this oxidation method, hydroxyl groups bonded to the sixth carbons in the cellulose chain are selectively oxidized so that glucoses in the cellulose chain are transformed into glucuronic acids. Since only a catalyst quantity of N-oxyl is required, for example, 10 ppm to 2% by weight (with respect to the cellulose fiber) of N-oxyl is sufficient for this method.

There is no particular limitation to the oxidation condition. Although the oxidation condition should be optimized according to desirable shapes required for the cellulose fiber and facilities available for the oxidation reaction, it is advantageous for significantly improving an efficiency of carboxy group introduction to perform the oxidation reaction under the presence of a bromide or an iodide because then the reaction proceeds smoothly even under a moderate condition.

A bromide and/or an iodide may be added if necessary. The amount(s) of the bromide and/or the iodide can be appropriately selected so as to promote the oxidation. For example, the amount is in the range from 100 ppm to 20% with respect to an amount of the cellulose fiber.

It is preferable that TEMPO as the N-oxyl and sodium hypochlorite as the co-oxidant are used under the presence of sodium bromide in the oxidation reaction system of the cellulose fiber of the present invention.

In this oxidation reaction of the cellulose fiber, it is preferable that the reaction is carried out at a temperature as low as possible under a room temperature unless the reaction system is frozen for the purpose of preventing an occurrence of side reactions and improving selectivity of the oxidation to the crystal surface of the cellulose fiber. It is possible to prevent side reactions such as oxidation of the inner crystal of the cellulose fiber if the temperature is the range of 0-30° C., or more preferably 5-20° C.

In addition, it is preferable that the oxidation reaction of the cellulose fiber is performed at a pH in the range of 9 to 11 in terms of reaction efficiency.

It is possible to estimate an amount of the carboxy group in the oxidized cellulose fiber by measuring conductivity of the oxidized cellulose fiber obtained above.

In the case where an appropriate amount of carboxy group is introduced, the oxidized cellulose fiber can become a stable fine fiber. In the case where the cellulose fiber is that of a wood pulp or a cotton pulp, a stable cellulose nanofiber can be obtained if the carboxy group amount with respect to a weight of the cellulose fiber is in the range of 0.1-2.5 mmol/g, or preferably in the range of 1.3-2.5 mmol/g.

In the present invention, since the cellulose fiber contains the above amount of carboxy group and is easily fiberized and structurally refined, a highly transparent substrate can be obtained.

In addition, when the cellulose fiber is oxidized by the above method, not only the carboxy group but also an aldehyde group is introduced. The aldehyde group may inhibit fiberizing the cellulose fiber into nanofibers and/or encourage the cellulose fiber to discolor. The cellulose fiber having the aldehyde group which is introduced by this method is severely discolored since not only the aldehyde itself can be discolored by heat, light or alkali etc. but also a double bond can be introduced by various decompositions such as β-hydrogen elimination etc. and/or cross-linking reactions can occur. The discolored cellulose fiber or the resultant transparent substrate has a low light transmittance and loses transparency. Particularly in the case where the transmittance of a light at 660 nm is 70% or less, the cellulose fiber does not effectively transmit light and cannot be used as a transparent substrate. On the other hand, in the case where the transmittance is 90% or more, the cellulose fiber can be used as a transparent substrate having a high level of transparency which can be used as a display component. There is no particular limitation to the upper limit of the light transmittance since a substrate with higher transparency is obtained as the transmittance increases.

A method in which sodium chlorite is used as an oxidant and the cellulose fiber is further oxidized makes it possible to remove the aldehyde group in the cellulose fiber. In this method, the aldehyde group which is introduced once in the cellulose fiber is further transformed into a carboxy group.

It is preferable that sodium chlorite is used as the oxidant to the oxidized cellulose fiber. When sodium chlorite is used, it is possible to selectively oxidize the aldehyde group, which is created by oxidizing a hydroxyl group, to further convert into the carboxy group.

In addition, similar to the case of the previous oxidation reaction (i.e. a first oxidation), this reaction is performed at a temperature preferably in the range of 0-30° C., more preferably in the range of 5-25° C.

It is preferable that the reaction system of this second oxidation has a pH of about 4 in terms of reaction efficiency, and acetic acid is preferably used for the pH adjustment.

It is possible to remove the aldehyde group, which is introduced by the first oxidation reaction, by carrying out this second oxidation reaction.

In addition, it is possible to estimate the carboxy group amount in the cellulose fiber after the second oxidation by measuring conductance of the resultant oxidized cellulose fiber. Moreover, it is possible to obtain the aldehyde group amount before the second oxidation by a difference between the carboxy group amounts before and after the second oxidation. In addition, when a still-further-oxidation (a third oxidation) is performed after the second oxidation, it is possible to obtain the aldehyde group amount after the second oxidation by a difference between the carboxy group amounts before and after the third oxidation.

In addition, a method of performing oxidation in water containing sodium chlorite under the presence of 4-acetoamide TEMPO as a catalyst in a weakly acidic to neutral condition preferably at a pH of 4-7 should be noted. Conventionally, a method of using hypochlorous acid or a hypochlorite such as sodium hypochlorite etc. as a co-oxidant has been known as a TEMPO oxidation. In the case where hypochlorous acid or a hypochlorite is used, however, since an aldehyde group is created as an intermediate in the cellulose molecule, the cellulose may be discolored when heated. On the other hand, since chlorous acid or its salts is an oxidant which can oxidize an aldehyde group, the created aldehyde group is rapidly transformed into a carboxy group and the aldehyde group is removed from the cellulose molecule. Hence, it is possible to prevent the cellulose from discoloring by heat when it is used as a film substrate.

Since a TEMPO oxidation conventionally has been carried out under an alkaline condition of about pH 10, it has been known that an elimination reaction caused by the aldehyde group easily occurs in the cellulose, resulting in a serious decrease of molecular weight of the cellulose. It is possible to reduce aldehyde groups in the cellulose and prevent the cellulose from having a low molecular weight by performing an oxidation with 4-acetoamide TEMPO under a weakly acidic to neutral condition at a pH in the range of 4 to 7. It is assumed that oxidized celluloses having a large molecular weight can provide a film (or a coated film) with a high level of flexibility due to tangles of molecules because their in-plane orientation in one direction is restricted and results in a low coefficient of elasticity.

Chemicals which are used for the TEMPO oxidation can be easily obtained commercially. It is preferable that the oxidation reaction is performed at a temperature in the range of 0-60° C. Then, it takes about 3-72 hours to introduce a sufficient amount of carboxy groups into the cellulose to transform the cellulose into fine fibers and to provide dispersibility. Incidentally, a hypohalous acid or its salts can be added to raise the rate of the reaction. It is preferable, however, that its additive amount is at most stoichiometrically about 1.1 with respect to the catalyst since the aldehyde group is easily created if the additive amount is excessively large.

The oxidation reaction is terminated by adding an excessive amount of another alcohol to completely consume the co-oxidant in the reaction system. It is preferable that an alcohol with a low molecular weight such as methanol, ethanol and propanol etc. is used as the alcohol which is added to the reaction system on this occasion in terms of a prompt termination. Among these, ethanol is desirable considering safety and resultant bi-products by the oxidation.

In addition, when a quantity of the aldehyde group contained in the oxidized cellulose fiber is in the preferable range, which is mentioned later, the quantity of the aldehyde group contained in the oxidized cellulose fiber can be estimated by total reflection infrared photo spectrometry because no peaks derived from an aldehyde group at wavelengths of $1720\ cm^{-1}$ and $900\ cm^{-1}$ are detected in a total reflection infrared photo spectrum of the transparent substrate.

In addition, when no aldehyde group is contained in the oxidized cellulose fiber, the absence of the aldehyde group in the oxidized cellulose fiber can be confirmed by C-NMR spectrometry since no peak derived from an aldehyde group at around 190 ppm is detected in the C-NMR spectrum.

The fewer aldehyde groups the cellulose fiber contains, the more desirable film which is hardly discolored (or yellowed) and can be suitably used as a transparent substrate is provided. The cellulose fiber is hardly discolored to provide a stable transparent substrate if it contains 0.20 mmol/g or less, preferably 0.03 mmol/g or less, of aldehyde groups with respect to a weight of the cellulose. A cellulose fiber with 0 mmol/g of an aldehyde group is the most desirable since the transparent substrate becomes better as fewer aldehyde groups are contained.

A transparent substrate of a cellulose fiber with 0.03 mmol/g or more of aldehyde groups changes in appearance to a yellowish color by heating at 100° C. for 3 hours or heating at 150° C. for 1.5 hours. This seems to be because the celluloses are liable to produce intermolecular and/or intramolecular cross-linkings which are three-dimensionally formed and/or because decomposition reactions easily proceed when aldehyde groups are contained in the cellulose. Incidentally, this change in color can be numerically confirmed by calculating a YI value from a light transmittance. It is preferable that the transparent substrate of the present invention after heating at 100° C. for 3 hours or heating at 150° C. for 1.5 hours has a YI value of 2 or less. If the YI is in the above range, the change in color of the transparent substrate by heating can be regarded as light.

Besides by the oxidation, which is described above, the aldehyde groups introduced into the cellulose fiber can also be removed by reduction. It is possible to transform the aldehyde group into a hydroxyl group by reduction by reacting sodium borohydride to the cellulose fiber.

In addition, in preparing a cellulose dispersion liquid of the present invention, it is possible to obtain a cellulose dispersion liquid of further finer and improved fibrous fine cellulose by further performing a fiberizing treatment to the oxidized cellulose after the oxidation. It is possible to use a normal juicer-mixer, a Henschel mixer, a high-speed mixer, a share mixer, a ribbon blender, a homo-mixer, a homogenizer, a high-pressure homogenizer, an ultrahigh-pressure homogenizer, an ultrasonic homogenizer, a ball mill, a sand mill, a planetary mill, a triple roll, a grinder, an attritor and a basket mill etc. for the fiberizing treatment.

Specifically, the above cellulose fiber is dipped or immersed in an aqueous medium as a dispersant. The liquid in which the cellulose fiber is dipped or immersed shows a pH, for example, of 4 or lower. As the cellulose fiber does not dissolve in aqueous medium, uneven slurry is obtained at the moment that the cellulose fiber is dipped or immersed. Subsequently, the pH of the slurry is adjusted to a value in the range of 4 to 12 with an alkali. The pH is particularly adjusted to an alkaline value in the range of 7 to 12 to form a carboxylate salt. Then, it becomes easily possible to obtain a finely fiberized cellulose nanofiber because electric repulsions among the carboxy groups improve dispersibility of the cellulose fiber. Cellulose nanofiber dispersion liquid can be efficiently obtained by performing the above fiberizing treatment under this condition.

Since the carboxy groups created on a surface of the cellulose fiber are forced to one another with electric repulsions to respectively diffuse in the dispersant, nanofibers are inclined to be isolated from one another to produce a transparent dispersion material. The dispersion liquid has a transmittance of 90% or more when measured by a spectral photometer at a wavelength of 660 nm under the condition of a 1 cm light path. The cellulose fiber becomes fine by the fiberizing treatment, and a cellulose nanofiber is obtained. It is preferable that the cellulose nanofiber after the fiberizing treatment has a number average fiber diameter (fiber width in a short axis direction) of 50 nm or less. It is possible to measure the fiber diameter of the cellulose nanofiber by a scattering electron microscope (SEM) or an atomic force microscope (AFM). In the case where the cellulose nanofibers insufficiently and/or unevenly disperse and thus those having a large fiber diameter are also blended together, only a film with poor transparency and smoothness is liable to be formed from the dispersion liquid.

It is known that carboxy groups are effectively introduced onto the crystal surface of the cellulose fiber if the cellulose fiber such as pulp etc. is oxidized by the oxidation method using TEMPO described above, and thus that the cellulose nanofiber is formed by the subsequent fiberizing treatment in water with energy lower than that is required to form a normal cellulose nanofiber. This cellulose nanofiber has a fiber diameter of 3 to 4 nm at the edge and a length of a few microns under the most appropriate condition. The cellulose nanofiber formed by this method can be preferably used as a material for the transparent substrate of the present invention.

It is possible to most efficiently fiberize the cellulose fiber if the fiberizing treatment is performed at a pH of about 10. Although the pH lowers as the fiberization proceeds, it is possible to fiberize to finer fibers by readjusting the pH to 10 and restarting the fiberization. It has been reported that an alkaline condition promotes a β-hydrogen elimination which breaks a glycoside bond in a polysaccharide such as cellulose etc. with heat. Thus, it seems that this is because the cellulose fiber has a significantly low molecular weight as a result of an occurrence of the β-hydrogen elimination.

At this time, it is preferable that the fiberizing treatment is performed at a low temperature because the cellulose fiber is discolored with heat due to an occurrence of intermolecular or intramolecular cross-linkings and decompositions. Other than this discoloration, which is accompanied with the reactions of the cross-linking and decomposition, robustness in a formed article made of the cellulose fiber tends to degrade as the molecular weight of the cellulose fiber decreases.

In addition, a dispersion liquid with a solid content rate of 1% having 2000 mPa·s or less of viscosity (shear rate: $10 \text{ s}^{-1}$) at 25° C. can be obtained when the cellulose fiber has a low molecular weight and the tangles among the cellulose fibers, which are dispersoid, are looser. In this way, it is possible to increase the solid content rate in the dispersion liquid while its viscosity is still kept low. When the dispersion liquid has low viscosity, workability is improved so that a transparent substrate with a uniform thickness, which serves to prevent unevenness in transmittance and/or refractivity, can be easily obtained.

Sodium hydroxide, ammonia and tetraalkylammonium hydroxide etc. can be used as the alkali which is used for the pH adjustment in the fiberizing treatment. A relatively dense film can be formed if sodium hydroxide is used. In addition, while it is assumed that a reaction of the aldehyde group contained in the cellulose fiber causes the discoloration, it is possible to prevent this discoloration by using sodium hydroxide since it hardly reacts with aldehyde. In addition, it is possible to prevent a salt deposition in forming a transparent substrate by using ammonia or tetraalkylammonium hydroxide. In addition, it is possible to promote a cross-linking reaction by using a volatile alkali.

The cellulose fiber obtained in the above method has a crystal structure of cellulose I. It is preferable that a transparent substrate of the present invention contains a cellulose fiber having a crystal structure of cellulose I and a fiber diameter in the range of 1-200 nm. In the case where the fiber diameter is the above range, a good and uniform film can be formed.

Since the molecular weight of the cellulose fiber influences transparency, discoloration, robustness and workability, as is previously mentioned, has its most desirable range, specifically, in the range of 100-1000 in terms of degree of polymerization. If the cellulose fiber has a degree of polymerization higher than 1000, it is impossible to ensure transparency and workability. On the other hand, if the cellulose fiber has a degree of polymerization lower than 100, it is impossible to retain mechanical strength.

In forming a transparent substrate of the present invention, an additive or a compound having a reactive functional group such as amino group, epoxy group, hydroxyl group, carbodiimide group, oxazoline group, polyethylenimine, isocyanate, epichlorohydrin, formaldehyde, glutaraldehyde and diepoxyalkane etc. is added to the dispersion liquid containing the cellulose fiber. Such an additive or a compound reacts with a hydroxyl group, carboxyl group or aldehyde group in the oxidized cellulose and provides an effect that a coat with various characteristics, particularly strength, waterproofness or moisture resistance, or adhesiveness to a layer arranged adjacent to the transparent substrate such as polarizer etc. is formed. For example, it is possible to make the cellulose fiber insoluble to water in which it is immersed by adding a polymer having a carbodiimide group as a cross-linking agent to the dispersion liquid of the cellulose fiber. For example, it is possible to fabricate a transparent substrate which has 50% of water absorption rate when immersed in water for an hour and 70% or higher of transmittance to light at 660 nm by adding a polymer having two or more functional groups which belong to one or more functional groups selected from the group of carbodiimide, oxazoline and isocyanate in a single molecule to a fiber containing a polysaccharide having at least a carboxy group or an amino group.

In the case where a cross-linking agent is used as the additive, a usage of a volatile base such as ammonia etc. may be effective since the reaction rapidly proceeds. This is because cellulose hardly reacts with the cross-linking agent when its carboxy group forms a salt at a high pH. If a base such as ammonia etc. is used, the pH value decreases as it vaporizes. Then, the carboxy group hardly forms a salt and the reaction easily proceeds.

It is preferable that a quantity of the reactive functional group mentioned above is stoichiometrically in the range of 0.01 to 5 with respect to the carboxy group, and in the range of 0.1 to 3 is more preferable. If the quantity is smaller than 0.01 with respect to the carboxy group in the cellulose, the effect of the additive is not achieved due to an insufficiency in crosslink density, and thus only a film which easily absorbs water is formed. It is not preferable if the quantity is greater than 5 because of a disadvantage in terms of costs and/or a problem that the formed film becomes brittle and easily cracks.

In addition, a pH in the range of 3-6 is preferable in terms of reaction efficiency when the above additive is used. Hydrochloric acid and acetic acid etc. are preferably used for the pH adjustment.

It is possible to obtain a transparent substrate of the present invention by drying the cellulose fiber which is described above. For example, it is possible to obtain a sheet of the transparent substrate to meet the purpose by casting the dispersion liquid which contains the cellulose fiber in a flat and smooth form and drying it at a temperature in the range from room temperature to 160° C. The lower the temperature on this occasion, the planer and/or the smoother and free from discoloration the transparent substrate is.

Another method is casting the dispersion liquid which contains the cellulose fiber in a flat and smooth form and drying it at temperatures rising in a stepwise way such as 100° C. for 10 minutes, 130° C. for 10 minutes and 150° C. for 10 minutes. Then, a plane and smooth sheet of the substrate can be obtained rapidly.

In addition, it is possible to remarkably reduce energy for removing a solvent by a method of casting, coating, embossing or molding the dispersion liquid which contains the cellulose fiber onto a surface of a porous substrate or a porous roll substrate. In addition, it is possible to obtain a planer and smoother substrate free from unevenness in transmittance and refractivity by pressing a single or a plurality of sheet(s) of the transparent substrate which is obtained by drying by a pressing machine or a calender etc.

In addition, it is possible to form a dense film if the dispersant of the dispersion liquid which contains the cellulose fiber is a solvent mixture containing an alcohol because drying efficiency is improved and little or no dispersant remains after the drying treatment is finished. Considering costs and boiling points, it is preferable that alcohol with a low molecular weight such as methanol, ethanol, 1-propanol, 2-propanol, 1-butanol and 2butanol is used as the alcohol.

General methods such as drying in vacuo and drying with hot air etc. can be used as the method for drying the dispersion liquid which contains the cellulose fiber.

It is preferable that a content ratio of the cellulose fiber in the transparent substrate of the present invention is in the range of 1 to 99.9%. A film with a sufficient thickness and mechanical strength can be obtained in a short time if the content ratio of the cellulose fiber in the transparent substrate is in the above range.

In addition, if the resultant film after the drying treatment receives a heating, various characteristics of the coat, particularly strength, waterproofness and/or moisture resistance, and/or adhesiveness to a layer arranged adjacent to the transparent substrate such as polarizer etc. is formed are improved. It is preferable that the heating is performed at a temperature in the range of 100-200° C., and is more preferable if in the range of 100-150° C. In the case where the heating is performed at 100° C. or lower, the resultant substrate does not have size-stability due to water adsorption and moisture absorption etc. because the reaction of the functional group in the cellulose sufficiently proceeds and sufficiently dense cross-linkings are not formed. On the other hand, in the case of 200° C. or higher, the cellulose may decompose and discolor. In addition, it is possible to provide sufficient cross-linkings to make the film water-resistive to fibers which have been fiberized using sodium hydroxide by heating the film at 100° C. or higher after the drying treatment.

It is preferable that the transparent substrate of the present invention has a linear expansion coefficient of 50 ppm/° C. or less in the temperature region of 30-150° C., and is more preferable if 50 ppm/° C. or less and further more preferable if 8 ppm/° C. or less. If the linear expansion coefficient of the transparent substrate is higher than this upper limit, problems in the production process caused by curling of the film may become severe and/or the additive agent may bleed from the film. In addition, when the transparent substrate has a layered structure, some of the layers may be peeled or stripped off if the linear expansion coefficient exceeds the upper limit. On the other hand, there is no lower limit to the linear expansion coefficient since deformations such as curling etc. hardly occurs as the linear expansion coefficient lowers.

In addition, when using the transparent substrate obtained here as a protection film for a polarizing plate, the polarizing plate is stuck to the transparent substrate with an aqueous adhesive. It is preferable that the transparent substrate of the present invention has a moisture permeability of 1-99 g/m$^2$·24 hr since adequate moisture permeability (preferably in the range of 1-99 g/m$^2$·24 hr) is required in order to dry the aqueous adhesive. If the moisture permeability is lower than this lower limit, the transparent substrate has insufficient adhesiveness and some of its layer may be easily peeled or stripped off. If the moisture permeability is higher than this upper limit, a sufficient polarizing performance cannot be maintained due to a decrease of moisture resistivity of the polarizing plate.

It is preferable that the transparent substrate has a thickness in the range of 10-200 μm. In case of a thickness lower than 10 μm, sufficient robustness cannot be retained and defects such as cracks etc. may be created on the transparent substrate. In the case of a thickness higher than 200 μm, high costs and a low transmittance are disadvantageous. In addition, the moisture permeability described above can be realized in this thickness range. The moisture permeability can also be adjusted by selecting a type of a hydrophobic additive and its additive amount.

Phosphate esters such as triphenyl phosphate, triethyl phosphate and trioctyl phosphate etc. and carboxylate esters such as dimethyl terephthalate and diethyl terephthalate etc. are examples of the hydrophobic additive.

It is preferable that an additive amount of the hydrophobic additive is in the range of 1 to 20%, more preferably 5 to 20%. In the case of an additive amount of 1% or less, it is impossible to adjust the moisture permeability whereas in the case of 20% or more, the moisture permeability is excessively low and adhesion problems may occur.

Depending on the intended use, an ultraviolet (UV) absorber and a degradation inhibitor etc. can be added to the transparent substrate of the present invention. It is also possible to add other additives such as a pigment, a dye and a disperser etc. unless it prevents the intrinsic effects of the present invention.

2-(5-methyl-2-hydroxyphenyl)benzotriazole, 2-(3-tert-butyl-5-methyl-2-hydroxyphenyl)-5-chlorobenzotriazole, 2-(4,6-diphenyl-1,3,5-triazin-2-yl)-5-[(hexyl)oxy]-phenol, 2,4-dihydroxybenzophenone and 2-hydroxy-4-n-octyloxybenzophenone etc. are examples of the UV absorber. 2-hydroxy-4-n-octyloxybenzophenone is preferable in terms of dispersibility.

It is preferable that the UV content amount in the transparent substrate is 0.001-5.0%, more preferably 0.01-1.0%, with respect to the transparent substrate. In the case where the UV absorber is less than 0.001%, the effect of its addition is not fully achieved. On the other hand, it is not preferable if the UV absorber is more than 5.0%, since light transmission is disturbed.

Although the UV absorber can be added at any stage of the process, it is most preferably added just before the transparent substrate is elongated and formed.

The degradation inhibitor inhibits degradation and decomposition of the oxidized cellulose. Compounds such as butylamines, hindered amines, benzotriazole UV absorbers and benzophenone UV absorbers etc. are examples of the degradation inhibitor.

It is preferable that the degradation inhibitor content amount in the transparent substrate is 0.001-5.0%, more preferably 0.01-1.0%, with respect to the transparent substrate. In the case where the degradation inhibitor is less than 0.001%, the effect of its addition is not fully achieved. On the other hand, it is not preferable if the degradation inhibitor is more than 5.0%, since it is disadvantageous in terms of costs and light transmission may also be disturbed.

Although the degradation inhibitor can be added at any stage of the process, it is most preferable that the degradation inhibitor is added just before the transparent substrate is elongated and formed.

It is preferable that the transparent substrate of the present invention has a light transmittance of 70% or more at 450 nm after heating at 100° C. for 3 hours or 150° C. for 1.5 hours. In the case where the light transmittance at 450 nm after heating at 100° C. for 3 hours is in this range, the transparent substrate does not discolor. There is no particular upper limit with respect to the light transmittance. The transparent substrate can be regarded as difficult to discolor if it retains the light transmittance of 70% or more even after heating. As is previously described, it is possible to control the light transmittance of the transparent substrate after heating by the aldehyde group content amount in the cellulose fiber of the transparent substrate.

EXAMPLES

Examples of the present invention are described below. These are only examples, and therefore, the present invention is not limited to these.

Preparation Example

TEMPO oxidation of cellulose is carried out according to the following procedure.
<1> Chemicals and Materials
Natural cellulose: bleached kraft pulp ("Mackenzie", I-type crystalline, Fletcher Challenge Canada Ltd.).
TEMPO: commercial item (98%, Tokyo Chemical Industry Co., Ltd.).
Sodium hypochlorite: commercial item (Cl: 5%, Wako Pure Chemical Industries, Ltd.).
Sodium chlorite: commercial item (79%, Kanto Chemical Co., Inc.).
Sodium bromide: commercial item (Wako Pure Chemical Industries, Ltd.).
<2> TEMPO Oxidation Treatment of Cellulose 10 g (dry weight) of the bleached kraft pulp was statically immersed in 500 ml of ion-exchange water in a 2 L-glass beaker and left over night to swell with water. After this was kept at 20° C. with a temperature-controlled water bath, 0.1 g of TEMPO and 1 g of sodium bromide were added under stirring so that pulp slurry was obtained. Subsequently, 5 mmol of sodium hypochlorite with respect to 1 g of cellulose was added to the pulp slurry under stirring. At this time, about 1 M of NaOH(aq) was added to the pulp slurry to maintain its pH at about "10.5". After a reaction was performed for 3 hours, the resultant oxidized cellulose was sufficiently rinsed with ion-exchange water.

A carboxy group amount contained in the resultant oxidized cellulose was measured in the following way. 0.2 g (in terms of dry weight) of the cellulose oxidized with TEMPO was put in a beaker and 80 ml of ion-exchange water was added. After 0.5 ml of 0.01 M NaCl(aq) was added, 0.1 M HCl(aq) was added with stirring to adjust the pH of the solution to 2.0. Then, conductivity and pH of the solution were measured every 30 seconds while pouring 0.05 M NaOH(aq) at 0.015 ml/30 sec. using an automatic titrator until the pH reached 11. A titer of NaOH was determined from the resultant conductometric titration curve for calculating the carboxy group content. The carboxy group amount was 1.55 mmol/g.

<3> Oxidation Treatment of Oxidized Cellulose (Second Oxidation)

After ion-exchange water was added to 2 g (dry weight) of the oxidized cellulose obtained in <2> in the section of <<Preparation example>> to make a slurry having 10% solid content, 1.81 g of sodium chlorite and 20 ml of 5 M acetic acid solution were further added. A reaction of oxidizing the aldehyde group created by the TEMPO oxidation proceeds in this solution for 48 hours at room temperature under stirring, and a product was sufficiently washed with water.

A carboxy group amount in the oxidized cellulose after the oxidation (a second oxidation) was measured in a way similar to the case of <2> in the section of <<Preparation example>>. The carboxy group amount in the oxidized cellulose after the second oxidation was 1.61 mmol/g.

In order to estimate the aldehyde group amount in the oxidized cellulose after the TEMPO oxidation and the aldehyde group amount in the oxidized cellulose after the second oxidation, respectively, the carboxy group amount in the oxidized cellulose after the second oxidation was measured after performing a further oxidation (a third oxidation) with sodium chlorite again in a similar way. Since all aldehyde groups contained in the oxidized cellulose were supposed to be transformed into carboxy groups, it was assumed as possible to estimate the aldehyde group amount in the oxidized cellulose after the TEMPO oxidation and the aldehyde group amount in the oxidized cellulose after the second oxidation by calculating a difference between the carboxy group amount in the oxidized cellulose after the second oxidation and the carboxy group amount in the oxidized cellulose after the TEMPO oxidation or the carboxy group amount in the oxidized cellulose after the third oxidation.

As a result of the third oxidation, the carboxy group amount after the third oxidation was 1.62 mmol/g. Accordingly, it was found that the aldehyde group amount in the oxidized cellulose after the TEMPO oxidation treatment was 1.62−1.55=0.07 mmol/g and the aldehyde group amount in the oxidized cellulose after the second oxidation was 1.62−1.61=0.01 mmol/g.

<4> Oxidation Treatment with 4-Acetoamide TEMPO 18 g (in terms of bone-dry weight) of cellulose was added to 700 g of sodium acetate buffer solution having a pH at 4.8 and stirred. After swelling with water, the cellulose was fiberized by a mixer. Subsequently, after 560 g of a buffer solution, 1.8 g of 4-acetoamide TEMPO and 15.3 g of sodium chlorite were added and 63 g of 0.16 mol/L aqueous solution of sodium hypochlorite was added, an oxidation reaction was performed at 60° C. for 48 hours. The reaction was terminated by adding 10 g of ethanol. Then, 0.5 M HCl(aq) was dripped to the reaction solution until its pH decreased to 2. This reaction solution was filtered with a nylon mesh and the resultant solid content was washed with water several times to remove chemicals or by-products so that oxidized cellulose with a 4% of solid content concentration and containing water was obtained.

The carboxy group amount in the oxidized cellulose after the oxidation treatment was measured in a way similar to the case of <2> in the section of <<Preparation example>>. The carboxy group amount in the oxidized cellulose was 1.60 mmol/g.

In order to estimate the aldehyde group amount in the oxidized cellulose after the oxidation with 4-acetoamide TEMPO, a second oxidation similar to the case of <3> in the section of <<Preparation example>> was carried out to measure the carboxy group amount. As a result of the second oxidation, the carboxy group amount after the second oxidation was 1.61 mmol/g. Accordingly, it was found that the aldehyde group amount in the oxidized cellulose after the oxidation with 4-acetoamide TEMPO was 1.61−1.60=0.01 mmol/g.

<5> Fiberizing Treatment of Oxidized Cellulose Obtained in <2> in <<Preparation Example>>

After an ion-exchange water solution of the oxidized cellulose obtained in <2> in the section of <<Preparation example>> was prepared to have a predetermined concentration and adjusted the pH to 10 under stirring, a treatment using a mixer (absolute mill, 14000 rpm, Osaka Chemical Co., Ltd.) for 1 hour was performed to fiberize so that a cellulose dispersion liquid which was transparent was obtained.

A molecular weight was estimated from a limiting viscosity of the resultant cellulose dispersion liquid. After being sufficiently dried, the oxidized cellulose fiber was dissolved in a 0.5 M cupriethylenediamine solution to prepare a solution of cellulose having a concentration of 2 mg/ml. Efflux viscosity of the solution was measured by a Cannon-Fenske viscometer and its limiting viscosity was derived from a viscosity equation. The oxidized cellulose had a degree of polymerization of 210 and a molecular weight of about 34000.

<6> Fiberizing Treatment of Oxidized Cellulose Obtained in <3> in <<Preparation Example>>

A cellulose dispersion liquid which was transparent was obtained by fiberizing the oxidized cellulose obtained in <3> in the section of <<Preparation example>> into fine fibers by a treatment similar to the case of <5> in the section of <<Preparation example>>. A molecular weight of the oxidized cellulose in the cellulose dispersion liquid was computed from a limiting viscosity, as in the case of <5> in the section of <<Preparation example>>. The oxidized cellulose had a degree of polymerization of 309 and a molecular weight of about 50000.

<7> Fiberizing Treatment of Oxidized Cellulose Obtained in <4> in <<Preparation Example>>

A cellulose dispersion liquid which was transparent was obtained by fiberizing the oxidized cellulose obtained in <4> in the section of <<Preparation example>> into fine fibers for 4 hours by a treatment similar to the case of <5> in the section of <<Preparation example>>. A molecular weight of the oxidized cellulose in the cellulose dispersion liquid was computed from a limiting viscosity, as in the case of <5> in the section of <<Preparation example>>. The oxidized cellulose had a degree of polymerization of 346 and a molecular weight of about 56000.

Examples 1-4

The cellulose dispersion liquid obtained in <6> in the section of <<Preparation example>> was casted on a polystyrene plate and dried at 50° C. in an oven for 24 hours to form films having a thickness of 20 μm (in example 1), 40 μm (in example 2), 60 μm (in example 3) and 250 μm (in example 4).

Example 5

A film was formed in a way similar to the case of <<Example 3>> except for adding 5% of triphenyl phosphate as a hydrophobic additive to the cellulose dispersion liquid obtained in <6> in the section of <<Preparation example>>.

Example 6

A film was formed in a way similar to the case of <<Example 3>> except for adding 0.5% of 2-hydroxy-4-n- octyloxybenzophenone as an UV absorber to the cellulose dispersion liquid obtained in <6> in the section of <<Preparation example>>.

Example 7

A film was formed in a way similar to the case of <<Example 3>> except for adding 0.5% of bis(2,2,6,6,-tetramethyl-4-piperidyl) succinate as a degradation inhibitor to the cellulose dispersion liquid obtained in <6> in the section of <<Preparation example>>.

Example 8

A film was formed in a way similar to the case of <<Example 3>> except for adding 5% of triphenyl phosphate as a hydrophobic additive, 0.5% of 2-hydroxy-4-n-octyloxybenzophenone as an UV absorber and 0.5% of bis(2,2,6,6,-tetramethyl-4-piperidyl) succinate as a degradation inhibitor to the cellulose dispersion liquid obtained in <6> in the section of <<Preparation example>>.

Example 9

A film was formed in a way similar to the case of <<Example 3>> except for using the cellulose dispersion liquid obtained in <5> in the section of <<Preparation example>>.

Example 10

A film was formed in a way similar to the case of <<Example 3>> except that the TEMPO oxidation was performed for 1 hour (reaction time) in <2> in the section of <<Preparation example>>. It was found that the oxidized cellulose obtained here has a carboxy group amount of 1.25 mmol/g and an aldehyde group amount of 0.01 mmol/g as a result of a measurement which was performed in a method described in <3> in the section of <<Preparation example>>. In addition, the oxidized cellulose had a degree of polymerization of 345 and a molecular weight of 56000 as a result of a calculation according to a method described in <5> in the section of <<Preparation example>>.

Examples 11 and 12

After adjusting the pH to 4.7 with hydrochloric acid, the cellulose dispersion liquid obtained in <7> in the section of <<Preparation method>> was admixed with EPOCROS WS-500 (by Nippon Shokubai Co., Ltd.) at a ratio of 1 equivalent weight of oxazoline group with respect to the carboxy group in the cellulose. The resultant cellulose dispersion liquid was casted on a petri dish made of glass, and dried at 50° C. in an oven for 24 hours to form films having a thickness of 10 µm (in example 11) and 40 µm (in example 12). After being further dried in a desiccator for a day, the films were heated at 150° C. for 1 hour.

Examples 13 and 14

After adjusting the pH to 4.7 with hydrochloric acid, the cellulose dispersion liquid obtained in <6> in the section of <<Preparation method>> was admixed with EPOCROS WS-500 (by Nippon Shokubai Co., Ltd.) at a ratio of 1 equivalent weight of oxazoline group with respect to the carboxy group in the cellulose. The resultant cellulose dispersion liquid was casted on a petri dish made of glass, and dried at 50° C. in an oven for 24 hours to form films having a thickness of 10 µm (in example 13) and 40 µm (in example 14). After being further dried in a desiccator for a day, the films were heated at 150° C. for 1 hour.

Examples 15 and 16

After adjusting the pH to 4.7 with hydrochloric acid, the cellulose dispersion liquid obtained in <7> in the section of <<Preparation method>> was admixed with EPOCROS K-2020E (by Nippon Shokubai Co., Ltd.) at a ratio of 1 equivalent weight of oxazoline group with respect to the carboxy group in the cellulose. The resultant cellulose dispersion liquid was casted on a petri dish made of glass, and dried at 50° C. in an oven for 24 hours to form films having a thickness of 10 µm (in example 15) and 40 µm (in example 16). After being further dried in a desiccator for a day, the films were heated at 150° C. for 1 hour.

Example 17

After adjusting the pH to 4.7 with hydrochloric acid, the cellulose dispersion liquid obtained in <5> in the section of <<Preparation method>> was admixed with EPOCROS WS-500 (by Nippon Shokubai Co., Ltd.) at a ratio of 1 equivalent weight of oxazoline group with respect to the carboxy group in the cellulose. The resultant cellulose dispersion liquid was casted on a petri dish made of glass, and dried at 50° C. in an oven for 24 hours to form a film having a thickness of 10 µm. After being further dried in a desiccator for a day, the films were heated at 150° C. for 1 hour.

Example 18

A film was formed in a way similar to the case of <<Example 11>> except for the absence of the pH adjustment of the cellulose dispersion liquid obtained in <7> in the section of <<Preparation example>> to 4.7 with hydrochloric acid.

Example 19

A film was formed in a way similar to the case of <<Example 12>> except for the absence of the addition of EPOCROS to the cellulose dispersion liquid obtained in <7> in the section of <<Preparation example>>.

Examples 20 and 21

After adjusting the pH to 4.7 with hydrochloric acid, the cellulose dispersion liquid obtained in <7> in the section of <<Preparation method>> was admixed with CARBODILITE V-02-L2 (by Nisshinbo Chemical Inc.) at a ratio of 1 equivalent weight of carbodiimide group with respect to the carboxy group in the cellulose. The resultant cellulose dispersion liquid was casted on a petri dish made of glass, and dried at 50° C. in an oven for 24 hours to form films having a thickness of 10 µm (in example 20) and 40 µm (in example 21).

Comparative Example 1

A film was formed in a way similar to the case of <<Example 3>> except that the TEMPO oxidation described in <2> in the section of <<Preparation example>> was not performed before the fiberizing treatment mentioned in <4> in the section of <<Preparation example>>. The cellulose had a degree of polymerization of 1300 and a molecular weight of 210000 as a result of a calculation according to a method described in <4> in the section of <<Preparation example>>.

Comparative Example 2

A film was formed in a way similar to the case of <<Example 9>> except that 0.2 g of TEMPO was used in the TEMPO oxidation in <2> in the section of <<Preparation example>>, and in addition, the reaction time was reduced to 0.5 hours. It was found that the oxidized cellulose obtained here has a carboxy group amount of 0.61 mmol/g and an aldehyde group amount of 0.26 mmol/g as a result of a measurement which was performed in a method described in <3> in the section of <<Preparation example>>. In addition, the oxidized cellulose had a degree of polymerization of 1200 and a molecular weight of 195000 as a result of a calculation according to a method described in <5> in the section of <<Preparation example>>.

Comparative Example 3

An 80 nm-thick triacetyl cellulose film which is commercially available is used.
<<Evaluation>>
The cellulose fiber and the resultant film were evaluated in the following method.
<1> Crystal Structure of Cellulose Fiber A crystal structure of the cellulose fiber was analyzed by an x-ray diffraction method. It was found that the cellulose fibers in the films of the examples 1-21 and the comparative examples 1 and 2 had a crystalline structure of cellulose I because the films showed peaks at 2θ=14.60°, 16.5° and 22.7° in its x-ray diffraction spectrum. A degree of crystallinity was calculated by the following equation.

Degree of crystallinity (%)=(I−Ia)/I×100

I: The peak intensity at 2θ=14.60°
Ia: The intensity corresponding to the point of intersection between two lines, one of which was a line that passes through the intensity at 2θ=12° and the intensity at 2θ=18°, the other one of which was a vertical line at 2θ=14.60° (which means the peak intensity in the amorphous region).
<2> Measurement of Fiber Diameter The celluloses of the examples 1-21 and the comparative examples 1 and 2 were dispersed or dissolved in water at a concentration 0.1%, respectively, and thinly pasted on a sample stage of an atomic force microscope (AFM). After drying with heat, the resultant sample was observed by the AFM. The results are shown in tables 1A, 2A and 3A.
<3> Measurement of Moisture Permeability Moisture permeability (g/m²/24 hr) of the films of the examples 1-10 and the comparative examples 1-3 was measured at 25° C. under the atmosphere of 60% RH by a cup method conforming to JIS (Japanese Industrial Standards) Z0208. The results are shown in tables 1A and 3A.
<4> Measurement of Light Transmittance and Calculation of YI Value Transmittance of the films of the examples 1-21 and the comparative examples 1-3 to light at 660 nm was measured using a spectral photometer U-4000 (made by Hitachi, Ltd.). In addition, transmittance of the films of the examples 1-10 and the comparative examples 1-3 to light at 450 nm after heating at 100° C. for 3 hours was measured using the spectral photometer U-4000 (made by Hitachi, Ltd.). In addition, transmittance of the films of the examples 11-21 to light at 450 nm after heating at 150° C. for 1.5 hours was measured using the spectral photometer U-4000 (made by Hitachi, Ltd.). The results are shown in tables 1B, 2B and 3B.

In addition, YI values of the films of the examples 1-10 and the comparative example 3 were calculated from their transmittance to light at 660 nm and transmittance to light at 450 nm after heating at 100° C. for 3 hours. In addition, YI values of the films of the examples 11-21 were calculated from their transmittance to light at 660 nm and transmittance to light at 450 nm after heating at 150° C. for 1.5 hours. The results are shown in tables 1B, 2B and 3B.
<5> Linear Expansion Coefficient Linear expansion coefficients of the films of the examples 1-10 and the comparative examples 1-3 were measured under an atmosphere of nitrogen at a temperature of 20-100° C. (2nd. heat) by EXSTAR, TMA/SS6100 made by SII Nanotechnology Inc. The results are shown in tables 1B and 3B.
<6> Measurement of Polarization Degree A polarizer was fabricated by elongating a polyvinyl alcohol film and adsorbing iodine to the film. Each of the films of the examples 1-10 and the comparative examples 1-3 was pasted to both surfaces of the polarizer with an adhesive so that a polarizing plate was manufactured.

After leaving the polarizing plate at 60° C. and 90% RH for 500 hours, its degree of polarization was measured. The evaluation criteria are as follows. The results are shown in table 1B and 3B.
○: The degree of polarization was 99.7% or more.
Δ: The degree of polarization was in the range of 99.2-99.7%.
x: The degree of polarization was less than 99.2%.

The degree of polarization was calculated in the following way.

Transmittance of a single polarization plate (single transmittance) was measured using a spectral photometer (DOT-3, made by Murakami Color Research Laboratory Co., Ltd.). In addition, transmittance of two identical polarization plates which are arranged with transmission axes parallel (parallel transmittance, H0) and transmittance of two identical polarization plates which are arranged with transmission axes orthogonally-crossed (orthogonal transmittance, H90) were measured, respectively. The degree of polarization was calculated by assigning the parallel transmittance (H0) and the orthogonal transmittance (H90) to the following equation.

Degree of polarization (%)={(H0−H90)/(H0+H90)}½×100

Incidentally, Y values in which luminosity was compensated according to JIS Z8701 were used as the single transmittance, the parallel transmittance (H0) and the orthogonal transmittance (H90).
<7> Stripping Test After drying the polarizing plates fabricated from the films of the examples 1-10 and the comparative example 1-3 at 60° C. for 24 hours, stripping tests were performed at 25° C. and 60% RH using an adhesive cellophane tape. The films of the examples 1-10 and the comparative example 1-3 were stripped from the polarizing plates. The degree of stripping was evaluated by the following criteria. The results are shown in table 1B and 3B.
○: No stripping occurred.
Δ: The film was partially stripped off.
x: Entire surface of the film was stripped off.
<8> Measurement of Water Absorption About 40 mg of portions were cut out from the films of the examples 11-21 respectively with a utility knife and were weighed in an electric balance. Subsequently, the portions were immersed in pure water for 30 minutes and were weighed again. The water absorption was calculated from the portion's weight between before and after the immersion.

TABLE 1A

| | Carboxy group amount (mmol/g) | Aldehyde group amount (mmol/g) | Degree of polymerization | Fiber diameter (nm) | Moisture permeability (g/m$^2$/24 hr.) |
|---|---|---|---|---|---|
| Example 1 | 1.61 | 0.01 | 309 | 3-5 | 4 |
| Example 2 | 1.61 | 0.01 | 309 | 3-5 | 3.8 |
| Example 3 | 1.61 | 0.01 | 309 | 3-5 | 3.6 |
| Example 4 | 1.61 | 0.01 | 309 | 3-5 | 2.8 |
| Example 5 | 1.61 | 0.01 | 309 | 3-5 | 2.8 |
| Example 6 | 1.61 | 0.01 | 309 | 3-5 | 3.6 |
| Example 7 | 1.61 | 0.01 | 309 | 3-5 | 3.9 |
| Example 8 | 1.61 | 0.01 | 309 | 3-5 | 2.8 |
| Example 9 | 1.55 | 0.07 | 210 | 3-5 | 3.7 |
| Example 10 | 1.25 | 0.01 | 345 | 4-6 | 4.3 |

TABLE 1B

| | Light transmittance | | YI value | | Linear expansion coefficient (ppm/°C.) | Degree of polarization | Stripping |
|---|---|---|---|---|---|---|---|
| | 660 nm | 450 nm (after 100° C., 3 hr.) | Initial value | (after 100° C., 3 hr.) | | | |
| Example 1 | 92.2 | 91.7 | 0.69 | 0.74 | 12 | ○ | ○ |
| Example 2 | 92.1 | 91.6 | 0.71 | 0.78 | 12 | ○ | ○ |
| Example 3 | 92.1 | 91.6 | 0.71 | 0.79 | 12 | ○ | ○ |
| Example 4 | 91.8 | 91.1 | 0.73 | 0.82 | 12 | X | ○ |
| Example 5 | 91.8 | 91.2 | 0.72 | 0.77 | 12 | ○ | ○ |
| Example 6 | 92.1 | 91.5 | 0.72 | 0.76 | 12 | ○ | ○ |
| Example 7 | 91.9 | 91.4 | 0.71 | 0.76 | 12 | ○ | ○ |
| Example 8 | 91.5 | 91.2 | 0.74 | 0.77 | 12 | ○ | ○ |
| Example 9 | 91.3 | 88.9 | 0.94 | 3.56 | 12 | Δ | Δ |
| Example 10 | 75.3 | 72.2 | 1.03 | 3.88 | 14 | X | X |

TABLE 2A

| | Carboxy group amount (mmol/g) | Aldehyde group amount (mmol/g) | Degree of polymerization | Fiber diameter (nm) | Crosslinking agent |
|---|---|---|---|---|---|
| Example 11 | 1.60 | 0.01 | 346 | 3-5 | WS-500 |
| Example 12 | 1.60 | 0.01 | 346 | 3-5 | WS-500 |
| Example 13 | 1.61 | 0.01 | 309 | 3-5 | WS-500 |
| Example 14 | 1.61 | 0.01 | 309 | 3-5 | WS-500 |
| Example 15 | 1.60 | 0.01 | 346 | 3-5 | K-2020 |
| Example 16 | 1.60 | 0.01 | 346 | 3-5 | K-2020 |
| Example 17 | 1.55 | 0.07 | 210 | 3-5 | WS-500 |
| Example 18 | 1.60 | 0.01 | 346 | 3-5 | WS-500 |
| Example 19 | 1.60 | 0.01 | 346 | 3-5 | None |
| Example 20 | 1.60 | 0.01 | 346 | 3-5 | V-02-L2 |
| Example 21 | 1.60 | 0.01 | 346 | 3-5 | V-02-L2 |

TABLE 2B

| | Light transmittance | | YI value | | Water absorption (%) |
|---|---|---|---|---|---|
| | 660 nm | 450 nm (after 150° C., 1.5 hr.) | Initial value | (after 150° C., 1.5 hr.) | |
| Example 11 | 91.4 | 90.6 | 0.6 | 0.9 | 0.0 |
| Example 12 | 90.5 | 90.1 | 0.7 | 1.1 | 30 |
| Example 13 | 91.2 | 90.5 | 0.6 | 0.9 | 0.0 |
| Example 14 | 90.5 | 90.1 | 0.7 | 1.1 | 30 |
| Example 15 | 89.2 | 88.3 | 1.5 | 1.8 | 20 |
| Example 16 | 88.4 | 87.5 | 1.7 | 2.1 | 40 |
| Example 17 | 90.8 | 89.4 | 1.8 | 3.5 | 0.0 |
| Example 18 | 91.4 | 90.6 | 0.6 | 0.9 | 160 |
| Example 19 | 90.9 | 90.2 | 0.6 | 0.8 | 1800 |
| Example 20 | 91.2 | 90.2 | 0.8 | 1.2 | 720 |
| Example 21 | 90.4 | 90.0 | 0.9 | 1.4 | 1020 |

TABLE 3A

| | Carboxy group amount (mmol/g) | Aldehyde group amount (mmol/g) | Degree of polymerization | Fiber diameter (nm) | Moisture permeability (g/m$^2$/24 hr.) |
|---|---|---|---|---|---|
| Comparative example 1 | 0 | 0 | 1300 | 20-200 | 15.3 |
| Comparative example 2 | 0.61 | 0.26 | 1200 | 50-100 | 13.2 |
| Comparative example 3 | — | — | — | — | 3.5 |

TABLE 3B

|  | Light transmittance | | YI value | | Linear expansion coefficient (ppm/° C.) | Degree of polarization | Stripping |
|---|---|---|---|---|---|---|---|
|  | 660 nm | 450 nm (after 100° C., 3 hr.) | Initial value | (after 100° C., 3 hr.) | | | |
| Comparative example 1 | 65.3 | 23.1 | — | — | 23 | — | X |
| Comparative example 2 | 68.3 | 29.8 | — | — | 19 | — | Δ |
| Comparative example 3 | 91.5 | 91.2 | 0.68 | 0.88 | 68 | ○ | ○ |

As is shown in tables 1A, 1B, 3A and 3B, it was found that in the case where the cellulose fiber had an appropriate amount of carboxy group, the film having the cellulose fiber had a high light transmittance and stripping hardly occurred in the polarizing plate which is made of such a film. In addition, it was found that it was possible to obtain a film which had heat resistance and hardly discolored by fabricating the film with a cellulose fiber containing few aldehyde groups.

As is shown in tables 2A and 2B, it was found that an addition of a cross-linking agent having an oxazoline group or a carbodiimide group to the cellulose fiber followed by heating makes it possible to inhibit the cellulose from absorbing water without adversely affecting its high light transmittance. In addition, it was found that the film with a cellulose fiber containing few aldehyde groups had heat resistance and hardly discolored even when the celluloses were cross-linked.

What is claimed is:

1. A method of manufacturing a transparent substrate comprising the steps of:

executing an oxidation process in which cellulose is oxidized in water with 2,2,6,6-tetramethyl-1-piperidine-N-oxyl as a catalyst under the presence of a co-oxidant to obtain oxidized cellulose;

executing a fiberizing process in which said oxidized cellulose is fiberized in water at a pH in the range of 7 to 12 to obtain a cellulose fiber;
wherein the fiberizing process comprises readjusting the pH to 10 and restarting the process to fiberize;

executing a preparation process at a pH in toe range of 3 to 6 using ammonia or tetraalkylammonium hydroxide with which said cellulose fiber is combined with a polymer having a plurality of functional groups in a single molecule wherein said functional groups are at least one selected from an oxazoline group and an isocyanate group; and executing a substrate-forming process in which a transparent substrate is formed using a cellulose dispersion liquid which contains the cellulose fiber.

2. The method according to claim 1, further comprising a heating process in which said transparent substrate is subjected to heat treatment after said substrate-forming process.

* * * * *